(12) United States Patent
Okada

(10) Patent No.: US 7,624,380 B2
(45) Date of Patent: Nov. 24, 2009

(54) GENERATING FUNCTIONAL TEST SCRIPTS

(75) Inventor: Akira Okada, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 194 days.

(21) Appl. No.: 11/753,041

(22) Filed: May 24, 2007

(65) Prior Publication Data

US 2008/0072100 A1    Mar. 20, 2008

(30) Foreign Application Priority Data

Jun. 5, 2006    (JP) ............................. 2006-155983

(51) Int. Cl.
G06F 9/44    (2006.01)
G06F 11/00    (2006.01)

(52) U.S. Cl. ........................ 717/125; 717/109; 717/131; 714/33; 714/38

(58) Field of Classification Search ........................ None
See application file for complete search history.

(56) References Cited

U.S. PATENT DOCUMENTS

| | | | |
|---|---|---|---|
| 6,505,342 B1* | 1/2003 | Hartmann et al. | 717/104 |
| 6,854,089 B1* | 2/2005 | Santee et al. | 715/783 |
| 7,076,713 B1* | 7/2006 | Hess | 714/741 |
| 7,290,245 B2* | 10/2007 | Skjolsvold | 717/125 |
| 7,398,469 B2* | 7/2008 | Kisamore et al. | 715/704 |
| 7,421,683 B2* | 9/2008 | Robertson et al. | 717/130 |
| 7,451,455 B1* | 11/2008 | El-Haj | 719/320 |
| 2005/0257198 A1* | 11/2005 | Stienhans et al. | 717/124 |
| 2007/0005281 A1* | 1/2007 | Haggerty | 702/108 |

FOREIGN PATENT DOCUMENTS

| | | |
|---|---|---|
| JP | 11282666 | 10/1999 |
| JP | 2002-014845 | 1/2002 |
| JP | 2002-366387 | 12/2002 |
| JP | 2003-044318 | 2/2003 |
| JP | 2003-337697 | 11/2003 |
| JP | 2004-265326 | 9/2004 |
| JP | 2005-085182 | 3/2005 |
| JP | 2006-113993 | 4/2006 |

OTHER PUBLICATIONS

Shingo Tsuda, "Agile development and test It is a development process strong against change, and is the customer satisfaction UP!", JAVA Press Gijutuhyouronsya Publishing Co., Dec. 15, 2005, vol. 45, pp. 52-62.

* cited by examiner

*Primary Examiner*—Michael J Yigdall
(74) *Attorney, Agent, or Firm*—Robert Straight; Shimokaji & Associates, P.C.

(57) ABSTRACT

A method for eliminating ambiguity and incorrectness of the specification determined in a requirement defining phase in developing an information system, and systematically verifying whether an automatically executed test scenario agrees with the original requirements in a functional testing phase, includes extracting an input variable, an output variable, and the respective types of the variables from a specification file in screens; extracting screen-transition information from a composite functional specification containing specifications in screens; and executing the following processes from the top for each screen that appears in screen transition. For the input variable, the apparatus generates a test script indicative of an action (clicking or a character set) corresponding to an object associated with the input variable. For the output variable, the apparatus generates a test script for comparing text information displayed on a screen with an expected value determined from the output variable.

4 Claims, 20 Drawing Sheets

FIG. 4
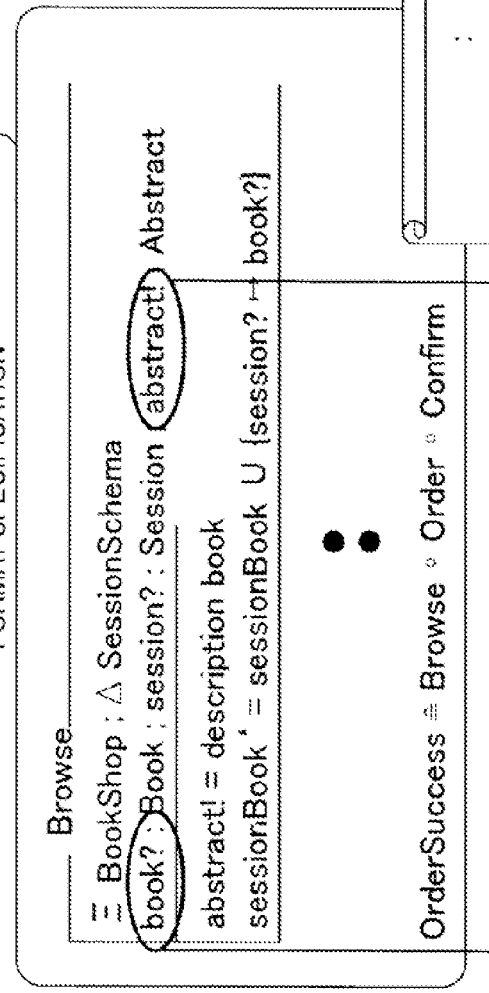
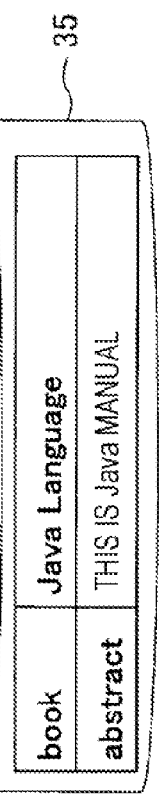

FIG. 8

UML STEREOTYPE

| BASE TYPE | STEREOTYPE | DESCRIPTION |
|---|---|---|
| CallBehaviorAction | any | SUPPORT NAVIGATOR BUTTON |
| | noTest | DO NOT COMPARE EXPECTED VALUE TO MEASURED VALUE |
| ControlFlow | link | ANCHOR TAG |
| | submit | SUBMIT BUTTON |
| InputPin | textField | TEXT FIELD |
| | select | LIST BOX |
| | radioButton | RADIO BUTTON |

FIG. 9

```
public class JSFSample extends JSFSampleHelper {
    public void testMain(Object[] args) {
        // initialization
        HtmlText htmlText = new HtmlText(this);
        Link link = new Link(this);
        Select select = new Select(this);
        Submit submit = new Submit(this);
        TextInput textInput = new TextInput(this);
        Radio radio = new Radio(this);

// body
        startBrowser(dpString("Application"));
        browser.waitForExistence();

select.select("titleOption", "contains");
        select.select("descriptionOption", "contains");
        textInput.setText("titleName", "titleValue");
        textInput.setText("descriptionName", "descriptionValue");
        radio.select("categorySelection", "All");
        submit.click("go");
        htmlText.test("SearchResults");
    }
}
```

91 — initialization block  
92 — body block  
93 — grouped section  
94 — radio.select("categorySelection", "All");  
95 — submit.click("go");  
96 — htmlText.test("SearchResults");

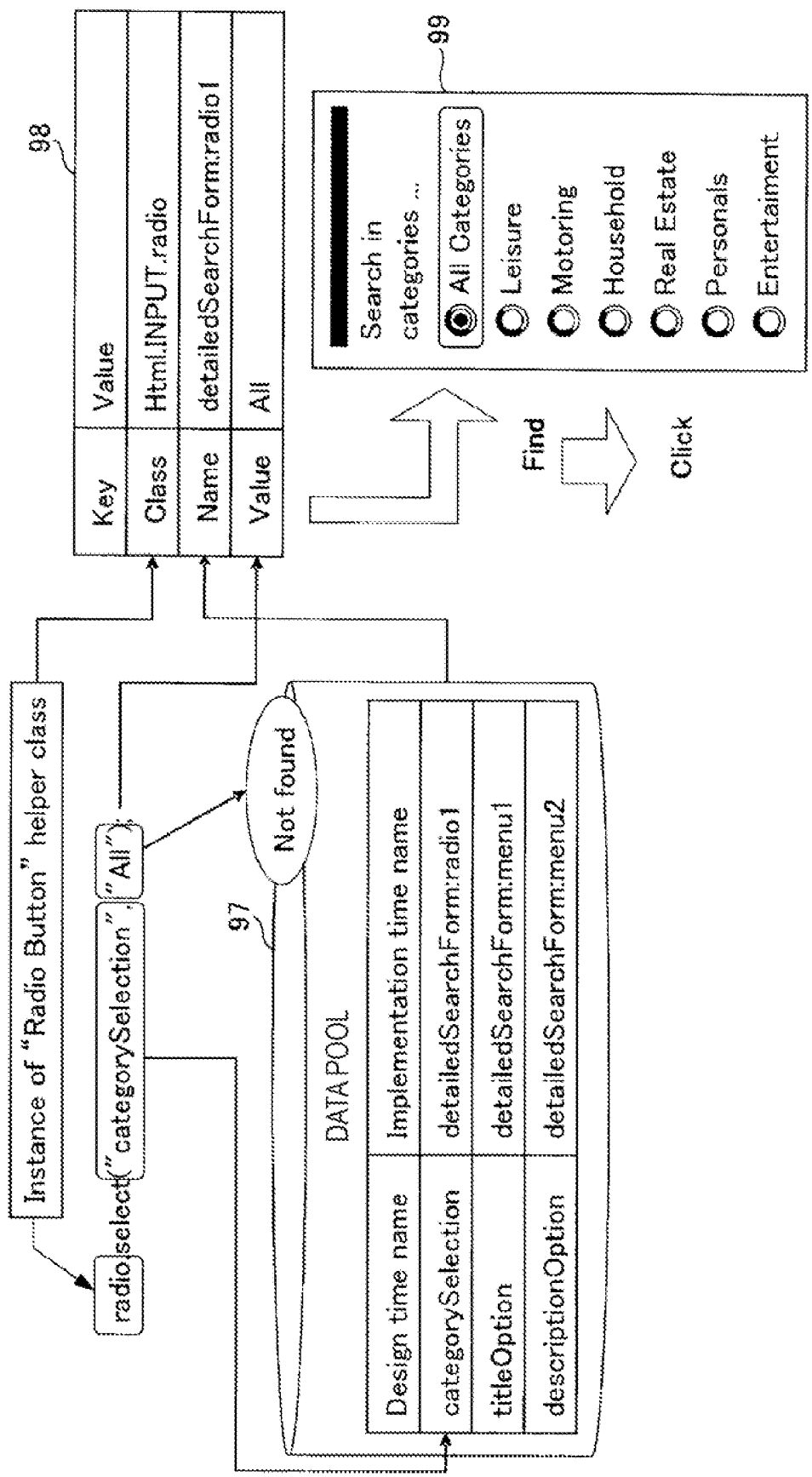

FIG. 12

| PATH | OUTPUT |
|---|---|
| {(H)} | {} |
| {(H,1), (H,2), (H,3)} | {} |
| {(H,1,4), (H,2,6), (H,3,5)} | {} |
| {(H,1,4,6), (H,2,6,H), (H,2,6,1), (H,3,5,7), (H,3,5,8)} | {} |
| {(H,3,5,8,3)} | {(H,1,4,6), (H,2,6,H), (H,2,6,1), (H,3,5,7)} |
| {} | {(H,1,4,6), (H,2,6,H), (H,2,6,1), (H,3,5,7), (H,3,5,8,3)} |

FIG. 13

| PATH | OUTPUT |
|---|---|
| {(H,1), (H,2), (H,3), (1,4), (2,6), (3,5), (4,6), (5,7), (5,8), (6,H), (6,1)} | [] |
| {(8,3)} | |
| {(H,2), (H,3), (2,6), (3,5), (5,7), (5,8), (6,1), (8,3)} | [(H,1,4,6,H)] |
| {(H,3), (3,5), (5,7), (5,8), (8,3)} | [(H,1,4,6,H), (H,2,6,1)] |
| {(5,8), (8,3)} | [(H,1,4,6,H), (H,2,6,1), (H,3,5,7)] |
| [] | [(H,1,4,6,H), (H,2,6,1), (H,3,5,7), (H,3,5,8,3)] |

FIG. 15

| METHOD | REDUNDANCY |
|---|---|
| BREADTH FIRST METHOD | 4 |
| DEPTH FIRST METHOD | 2 |
| DEPTH FIRST - COMBINATION METHOD | 1 |

FIG. 17

| NAME OF Form ELEMENT | TYPE OF Form | NUMBER OF OPTIONS |
|---|---|---|
| Title | ListBox | 2 |
| Description | ListBox | 2 |
| Document Dated | ListBox | 3 |
| Display Results | ListBox | 5 |
| Search in Categories | RadioButton | 7 |

FIG. 19

| METHOD | EXECUTION COUNT |
|---|---|
| Home TRANSITION METHOD | 1343 |
| Form-SCREEN TRANSITION METHOD | 1008 |

FIG. 20

```
String name = mainScript_.dpString(inputName);
String value;
try {
        value = mainScript_.dpString(inputValue);         180
}
catch (Exception e) {
        value = inputValue;         181
}
```

GENERATING FUNCTIONAL TEST SCRIPTS

FIELD OF THE INVENTION

The present invention relates to an apparatus, a method, and a program for generating a test script for functional testing in developing an information processing system.

BACKGROUND

A large number of efficient systems for a testing phase in information system development have been proposed.

For example, Japanese Unexamined Patent Application Publication No. 6-110733 discloses a test-case generating apparatus for generating a script file for testing programs and test data by combining program specifications with a standard script file. Japanese Unexamined Patent Application Publication No. 9-223040, Japanese Unexamined Patent Application Publication No. 9-223041, and Japanese Unexamined Patent Application Publication No. 9-223042 disclose a system-test supporting apparatus and the like configured to describe the specification of an application having a GUI section into a specification file or an information file and then to automatically generate a comprehensive test scenario. Japanese Unexamined Patent Application Publication No. 11-306046 includes a method for generating a test case from tabular functional specifications. Japanese Unexamined Patent Application Publication No. 2000-339193 includes a method for converting an operation specification from an operation specification and initial conditions to generate a test case. Japanese Unexamined Patent Application Publication No. 2004-280231 shows a method of verifying software in which a two-dimensional factor analysis table is generated from program input conditions and operating environment conditions, and then the input conditions and the operating environment conditions are combined to automatically generate a test script.

Various other methods for generating test cases from various unique definition information are shown in Japanese Unexamined Patent Application Publication No. 2002-259161, Japanese Unexamined Patent Application Publication No. 2002-366387, Japanese Unexamined Patent Application Publication No. 2004-220330, and Japanese Unexamined Patent Application Publication No. 2005-115582.

It is known in general information system development that the cost and risk of constructing systems are increased because of the ambiguity and incorrectness of specifications determined in a requirement defining phase. Since the 1970s, attempts to solve these problems have been made by strictly defining systems using formal specification languages. However, this is not broadly used because of high introduction cost. For a functional testing phase, regression testing with higher productivity is generally achieved by using automatic execution tools. However, test scripts for regression testing are generated with the recording function of the tools or by manual coding, posing the problem of taking much time and cost, and that it is impossible to verify whether automatically executed test scripts agree with the original functional requirements (specifications).

The methods of the foregoing patent documents need manual generation of specification files, tabular files, or state transition diagrams based on their unique definitions, which cannot support specification description methods using standardized formal specification languages or Universal Model Language (UML).

Accordingly, it is an object of the invention to provide, in system development using a standardized specification description method with a formal specification language or UML modeling description, a test-script generating apparatus for functional testing which ensures consistency with a specification determined by requirement definition and achieves an efficient method so as to generate a test script without high cost.

SUMMARY

The invention includes an apparatus for generating from a functional specification of software a test script for executing a functional test of the software. The apparatus includes: an input/output variable extracting section for extracting from a specification file describing the functional specification an input variable, an output variable, an input-variable type, and an output variable type for each runtime display screen generated by the software; a screen-transition extracting section for extracting screen-transition information from the specification file; and a test-script generating section for generating a test script for executing the functional test using the input variable, the output variable, the input-variable type, the output variable type, and the screen-transition information.

The apparatus may be configured such that, according to the screen-transition information, the test-script generating section generates, for the input variable, a test script indicative of an action corresponding to an object associated with the input variable; and for the output variable, a test script that compares text information displayed on a display screen that the software generates at runtime with an expected value determined from the output variable.

The apparatus may be configured such that the object includes a button (including a radio button and a list box), a text field, and a list box; and the action corresponds to a selection from a user click operation, a character-string input operation, or an operation of selecting out of a list.

The apparatus may be configured such that the test-script generating section optimizes the execution count of testing by finding, in a directed graph in which each edge represents screen transition, an edge path set including at least one edge path for each edge of the screen transition, in which a redundancy value is smaller than a predetermined value.

The apparatus may be configured such that the edge path set is found by a predetermined "depth-first-combination algorithm".

The apparatus may be configured such that the test-script generating section finds an edge path set for executing the shortest screen transition according to a predetermined "Form-screen transition algorithm", for testing any combination of Form elements.

The apparatus may be configured such that the specification file is described in Z language.

The apparatus may be configured such that the test-script generating section determines the order of priority for determining a type of an object associated with the input variable in the order of (1) an object type described in a predetermined property file, (2) a type name of the input variable, (3) link object type.

The apparatus may be configured such that the test script uses a runtime library that is called at the execution of testing of an application, so as to dynamically search for an object associated with the input variable in a browser displaying a test screen according to a type and an object name of the object.

The apparatus may be configured such that the specification file is described in a UML activity diagram.

The apparatus may be configured such that the UML activity diagram includes at least one UML element of a screen element, Form element, and a screen-transition element.

In brief, the apparatus of the invention can automatically generate a test script conforming to the functional specification by the following operations:

1) extracting an input variable, an output variable, and the respective types of the variables from a specification file for each screen, 2) extracting screen-transition information from the specification file; and 3) executing the following processes from the top from one screen to another that appear in screen transition obtained in (2).

a) for the input variable, the apparatus generates a test script indicative of an action (clicking or a character set) corresponding to an object associated with the input variable;

b) for the output variable, the apparatus generates a test script that compares text information displayed on a screen with an expected value determined from the output variable.

The method of the invention supports a modeling description method using Z language, or a formal specification language, and UML as a standardized specification description method. However, other specification description methods (e.g., Vienna development method (VDM)) should not be excluded. The invention also provides an algorithm for generating a test script with little redundancy which covers all the paths between the nodes and edges in an effective graph in which the nodes represent the screens of software to be tested and the edges represent screen transition.

According to another aspect of the invention, there are provided a method for executing the function of the apparatus and a computer program having computer usable program code for generating a test script for executing the steps or algorithm of the method. According to yet another aspect of the invention, there is provided a program product including computer readable media that store the computer program.

The invention can provide an apparatus of generating a test script and so on which ensure consistency with the specification determined by requirement definition and achieves an efficient method so as to generate test scripts without high cost without using a unique-definition specification describing method in developing an information system using a formal specification language or a standardized specification describing method such as a UML modeling describing method. This ensures that the functional test reflects requirement definition and allows the specification to be used also for functional testing, thus reducing part of the cost for generation.

BRIEF DESCRIPTION OF THE DRAWINGS

The invention will now be described in further detail with reference to the drawings, wherein:

FIG. 4 is a diagram showing the method for generating a script and the flowchart for the process of the same in the first embodiment of the invention;

FIG. 8 is a diagram showing UML stereotypes and descriptions therefor in the second embodiment of the invention;

FIG. 9 is a diagram showing the execution count of screen transition in the second embodiment of the invention;

FIG. 10 is a diagram showing the dynamic search for a GUI object in the second embodiment of the invention;

FIG. 12 is a diagram showing how Paths and Outputs change when algorithm 1 is applied to the directed graph of FIG. 11 in the third embodiment of the invention;

FIG. 13 is a diagram showing how Path and Outputs change when algorithm 2 is applied to the directed graph of FIG. 11 in the third embodiment of the invention;

FIG. 15 is a diagram showing differences in redundancy when the methods are applied to the directed graph of FIG. 11 in the third embodiment of the invention;

FIG. 17 is a diagram showing Form elements and the number of options in the fourth embodiment of the invention;

FIG. 19 is a diagram showing a difference in the count of screen-transition execution between the methods in the fourth embodiment of the invention;

FIG. 20 is a diagram showing an example of implementation in which design names and implementation names can be coresident in a configuration in which the presence of a data pool or entries in the data pool are not postulated in a fifth embodiment of the invention.

DETAILED DESCRIPTION

Figure 1:
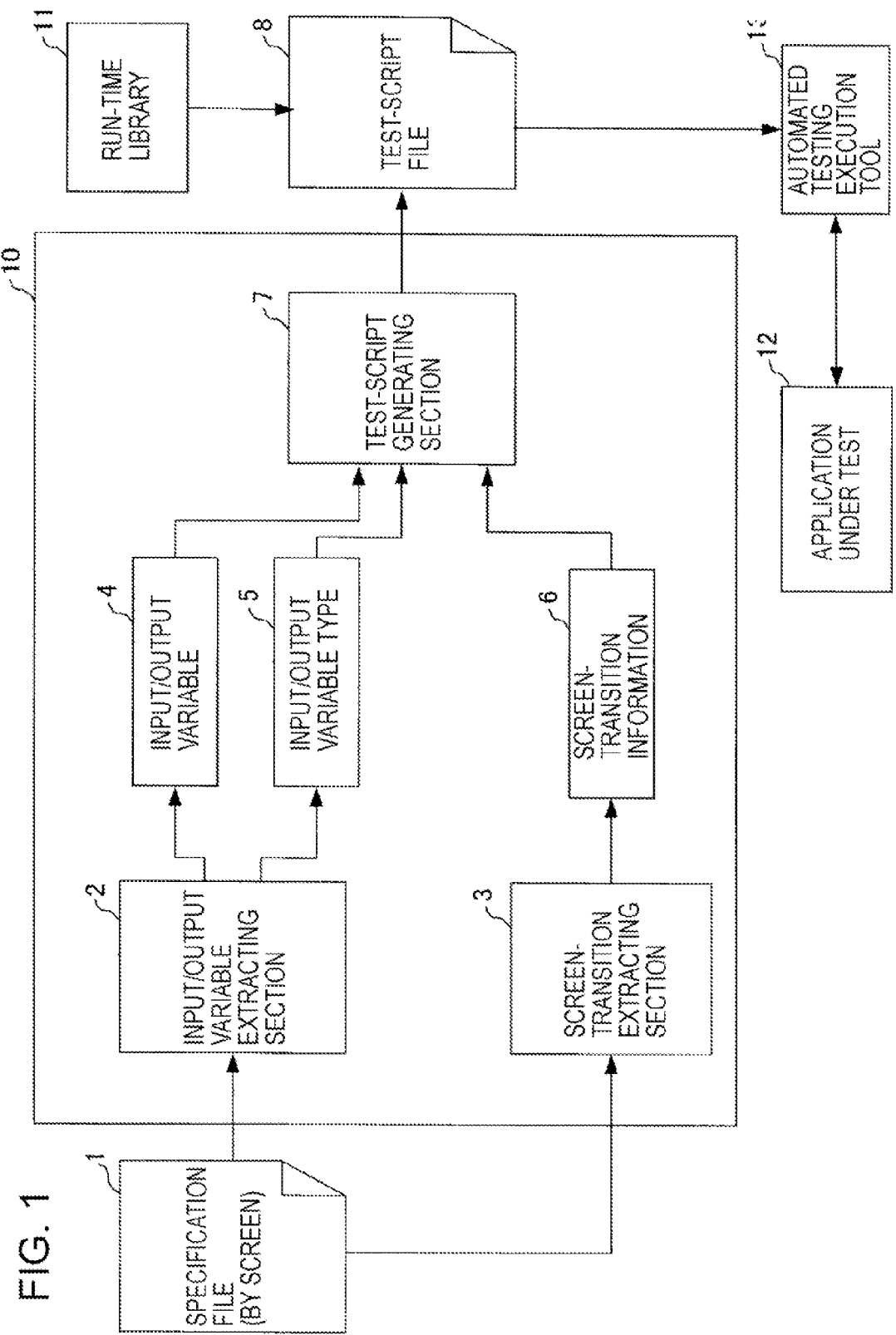
FIG. 1 is a functional block diagram of a test-script generating apparatus 10 according to a preferred embodiment of the invention.

FIG. 1 is a functional block diagram of a test-script generating apparatus 10 including the above-described solving means according to a preferred embodiment of the invention. The apparatus primarily includes an input/output variable extracting section 2, a screen-transition extracting section 3, and a test-script generating section 7. The apparatus further includes a controller (CPU) and a storage section (which are not shown). The apparatus may also include an input/output section to communicate with the operator of the apparatus or other systems and a communication control section. The configurations are merely examples; other variations having equivalent functions may be included. The apparatus is typically achieved by a computer such as a personal computer or a general-purpose computer; however, it may be achieved by another information processing unit having a microprocessor, a storage section, and appropriate input/output means.

The input/output variable extracting section 2 of the apparatus extracts an input/output variable 4 for use in a screen in the unit of screen by using the characteristics of the describing method of a specification file 1 of a system under test described by the developer, with the specification file 1 as input data. At that time, the input/output variable extracting section 2 extracts the input/output variable 4 and an input/output variable type 5 (the type of the input/output variable) corresponding thereto at the same time. A specific extracting method will be described for each embodiment of the specification description, to be described later.

A screen-transition extracting section 3 of the apparatus detects the information on each screen contained in the specification file 1 to extract screen-transition information 6 on the transition of the screens. A concrete extracting method will be described for each embodiment of the specification description, to be described later.

A test-script generating section 7 of the apparatus generates a test-script file 8 for automated functional testing using the input/output variable 4 and the input/output variable type 5 output from the input/output variable extracting section 2 and the screen-transition information 6 output from the screen-transition extracting section 3 as input data. An automated-testing executing tool 13 tests an application 12 by executing the generated test-script file 8. A runtime library 11 called from the test-script file 8 can dynamically search for an object associated with the input variable at the execution of testing in a browser on which a test screen is displayed using the object type and the object name as key. According to an embodiment of the invention, while the test-script file is installed so as to be used as an input for Rational Functional Tester (RFT)™ which is a known automated-testing execution tool, the automated-testing execution tool is not limited to that. The conditions that the automated-testing execution tool 13 has to meet will be described later. The invention will be specifically described herein with reference to embodiments.

Figure 2:
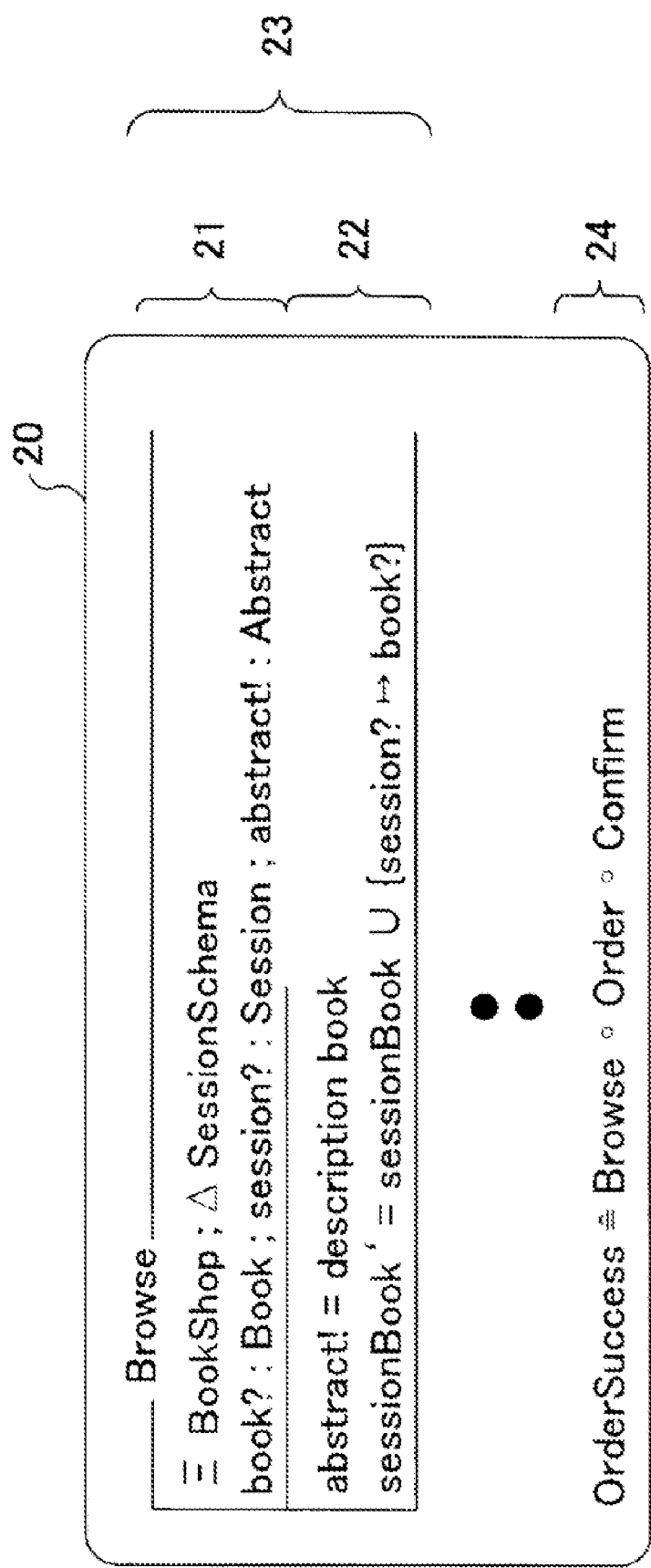
FIG. 2 is a diagram showing an example of a simple schema named "Browse" according to a first embodiment of the invention.

First Embodiment: Implementation Example of Using Z as Formal Specification Language. Here an implementation example using Z as a formal specification language and the above-mentioned RFT as an automated-testing execution tool for functional testing will be described. Among formal specification languages, Z is used most frequently, which is also standardized by ISO. Z has a notation based on the theory of sets and a predicate logic, whose specification is described in schemas. FIG. 2 shows an example of a simple schema named "Browse". This example shows such a specification that when a specific book is selected from a list of books, its summary is displayed. The schema in the description of FIG. 2 is indicated by numeral 23. The upper part 21 of the schema 23 indicates a declaring section in which variables and functions are declared. For example, the fact that variable x is an element of set X is expressed as "x:X". Here, "?" at the end of the variable name "book" indicates that it is an input variable, and "!" at the end of the variable name "abstract" indicates that it is an output variable.

Since the schema declaring section 21 declares a variable in the form of "variable name:type name", the type of the variable can be known. Furthermore, a combination of schemas "schema calculus" is defined, one of which is "schema composition", which can describe a state transition across a plurality of schemas. In the example of FIG. 2, the part indicated by numeral 24 shows schema composition. In this embodiment, it is assumed that schemas are defined in the unit of screen (Z language itself does not have such limitation). Thus, screen transition can be described by schema composition 24.

As has been described, Z allows determination whether a variable is an input variable or an output variable from the variable name described in the schema declaring section 21. Its fundamental concept is that, for input variables, a script indicative of an action to a corresponding object is generated, and for output variables, a script to compare text information displayed in a browser with an expected value corresponding to the output variable is automatically generated. However, since there is a semantic gap between the specification described in Z and the programming model of RFT, it is necessary to solve the four subjects described below. They are described in the following (A) to (D).

(A) Screen-Transition Derivation Rule: The specification described in Z does not specify by what screen separation and screen transition it is achieved. Therefore, it is coped with by making the following rules:

Rule 1: Bring a schema and a screen into one-to-one correspondence.

Rule 2: Display screen transition by a schema composition.

The schema composition is a kind of a schema operation. For example, if schema A causes the state of the system to transition from S1 to S2 and causes schema B transition from S2 to S3, schema C which is a composition of the two schemas is described as [Expression 1], which causes the state of the system transition from S1 to S3.

$$C \cong A * B \qquad [\text{Expression 1}]$$

Since schemas A and B correspond to screens AP and BP, respectively, under rule 1, it can be interpreted that schema C corresponds to screen transition AP to BP.

(B) Mapping of Input Variable and Object Type: It cannot be determined from the input variable name that appears in the declaring section of the specification with what type of object it is installed. For example, it cannot be determined whether the variable, book, in FIG. 2 indicates inputting the name of a book into the text field on the browser or clicking the name of the book displayed as a link. To solve the problem, we have adopted a method of preparing a property file and describing the mapping of variable names and object type names in the form to be described later. However, since it is complicated to describe such a correspondence relation of all the input variables, we have devised a rule to be applied when there is no entry in a property file. This will be described later in a fifth embodiment.

(C) Handling of Session information: For Web applications, in order to hold session information, a session key is stored in a cookie etc. The session key needs to be described as an input variable for specifications using Z language. In contrast, information about a session key which does not appear in the operation of the user cannot be described because RFT script corresponds to user operation. In order to solve this problem, a script is not generated for an input variable mapped to an object type called Session. An object type to which an input variable is mapped is determined in the following order of priorities.

1) An object type described in property file

2) An object type with the same name as a set name when the set name to which the input variable belongs is any of Session, Submit (it corresponds to submit button) or Password (it corresponds to password field)

3) An object type called Link (it corresponds to an anchor tag, which is used as a default).

(D) Method for Specifying Object Runtime: Even if the object type is determined, it cannot be known where of the Document Object Model (DOM) tree the object itself is present. Therefore, the object is dynamically searched for by using Application Program Interface (API) provided by RFT. The key for search includes the object type and the names of the link and the button. Since the latter is generally different from the variable name described in the specification, the input variable name and the implementation name are mapped using the data pool of RFT. The data pool is used also for mapping output variable names and expected values to achieve separation of the test script from data.

Means for solving the above problems will be described hereinbelow more specifically.

(1) Object Type and control.properties File: From the input variable name in the declaring section of the schema, it cannot be determined by what kind of control (a button, a text field, etc., hereafter also called an object type) it is implemented. Therefore, mapping of input variable names and object type names is described in a property file named control.properties in the following form.

Schema name, input variable name=object type name

For example, Confirm.user=Text. Examples of the object type are as follows:

TABLE 1

| Object Type | Description | Action |
| --- | --- | --- |
| Session | Indicative of Session key that does not correspond to GUI | N/A |
| Submit | Corresponding to Submit button | Click |
| Text | Corresponding to test field | setText |
| Password | Corresponding to pass word field | setText |
| Link | Corresponding to anchor tag | click |

A script is not generated for an input variable mapped to Session. This is because although a session key must be described as an input variable in Z language, no session key appears in a script on RFT (because it does not correspond to user operation).

(2) Method for Determining Object Type: Since it is complicated to describe the mapping of all the input variables to the object types in the control.properties file, the object type is determined in the following order of priority. This eliminates the need for describing the mapping in the control.properties file in most cases.

1) An object type described in control.properties
2) The same object type as the type name when the type name to which the input variable belongs is any of Session, Submit, and Password.
3) Link object type (used as a default)

(3) Dynamic Search for Object Corresponding to Input Variable and Driving of Action: To describe a generated script in a simple form, wrapper class is generated using RFT API to each GUI object. For example, when Submit button expressed by an input variable, order, is clicked, the description is as follows:

```
//initialization
Submit submit = new Submit (this);
// body
    :
    :
submit, click ("order");
```

First, an object corresponding to "order" is dynamically searched for in the browser in the click method of Submit class. The key for search includes an object type and a button name. Here although "order" is an input variable name appearing in the specification, it is conceivable that the button name for implementation is generally different. Accordingly, the data pool of RFT in Submit class is accessed to obtain implementation name. Then, click method is called for the found object.

(4) Comparison between Expected Value Corresponding to Output Variable and Text Displayed on Browser: An expected value corresponding to the output variable and the text displayed on the browser are compared. In the example of the schema in FIG. 2, abstract is an output variable. An expected value therefor is described in the data pool of RFT to achieve the separation of the script from the data. To obtain the text displayed on the browser, a wrapper class called HtmlText is generated, in which an object of a class "Html.HtmlDocument" is dynamically searched for. Its text attribute is a text displayed on the browser. Comparing the expected value and the measured value using the VerificationPoint class of RFT allows test results to be automatically obtained at the end of testing.

(5) Test Script Generating Algorithm: Suppose that each screen is expressed as schema Ai (i=0 to n−1). Their schema composition C=A0 o A1 o, to o An−1 indicate screen transition A0→A1→ . . . →An−1. The algorithm for generating a test script corresponding to C is as follows:

The following operation is executed from i=0 to n−1.

1) Determine the object type of all the input variables Ai by the method (2). (for example, a button)
2) Determine actions for the determined objects. (for example, a click action for a button)
3) Generate the script indicated in (3). When there are two or more input variables, generate the script for Link or Submit last.
4) Compare the expected value with the actual text for output variable Ai by the method of (4).

Figure 3:
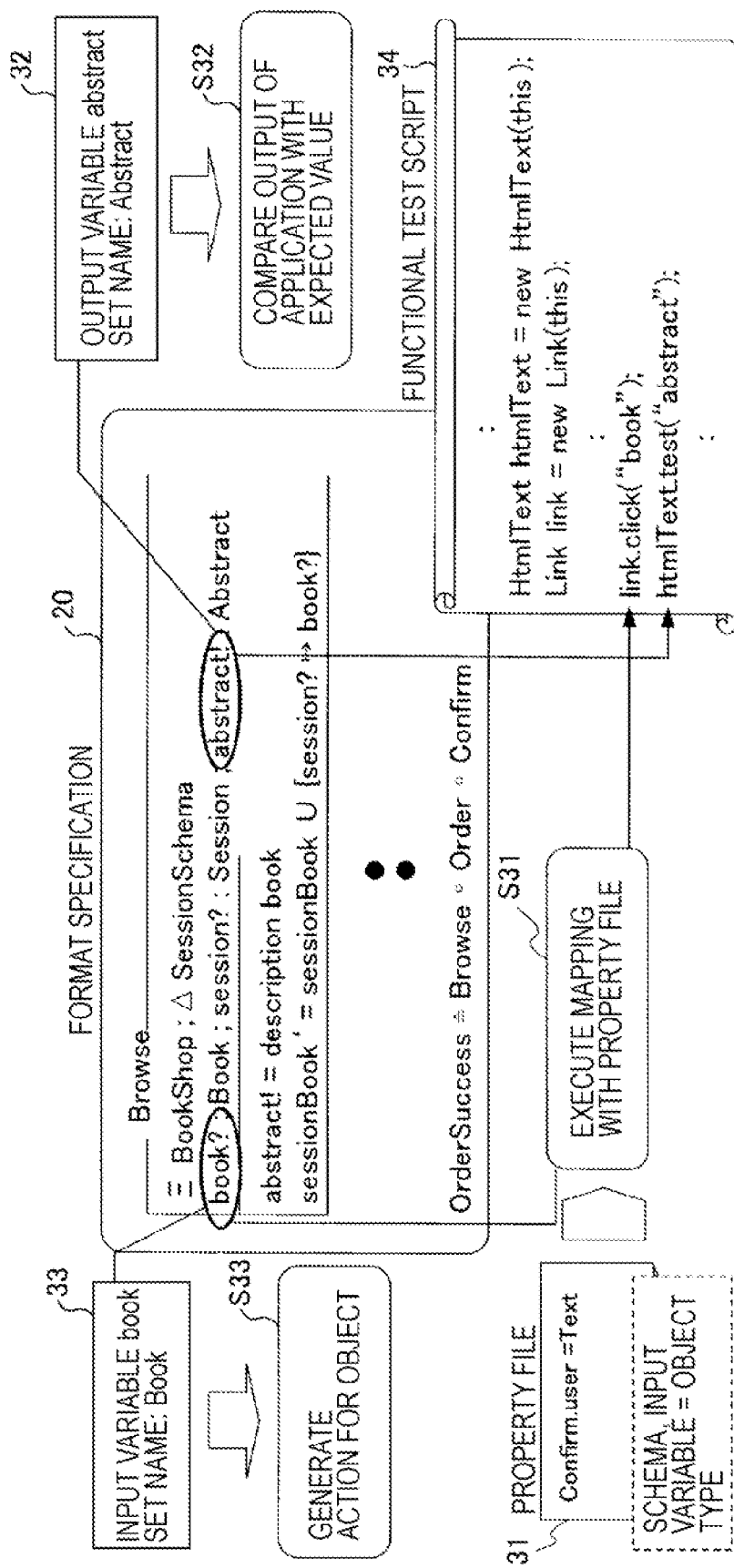
FIG. 3 is a diagram showing a method for generating a script and a flowchart for the process of the same in the first embodiment of the invention.

FIGS. 3 and 4 show the method for generating a script and the flow of the process using the same. Referring to FIG. 3, in step S31, mapping of the objects is executed with reference to the property file. In step S33, an input variable is extracted to generate an action for the object. For an output variable, the output of the application is compared with the expected value in step S32. As a result, a functional test script 34 is generated. Referring next to FIG. 4, in step S 34, the specification name and the implementation name are mapped with reference to a data pool 35. Step S34 is executed by the runtime library 11 of FIG. 1. In step S35, a dynamic search for the object using the API of RFT is executed using the object type and the name as search key.

Figure 5:
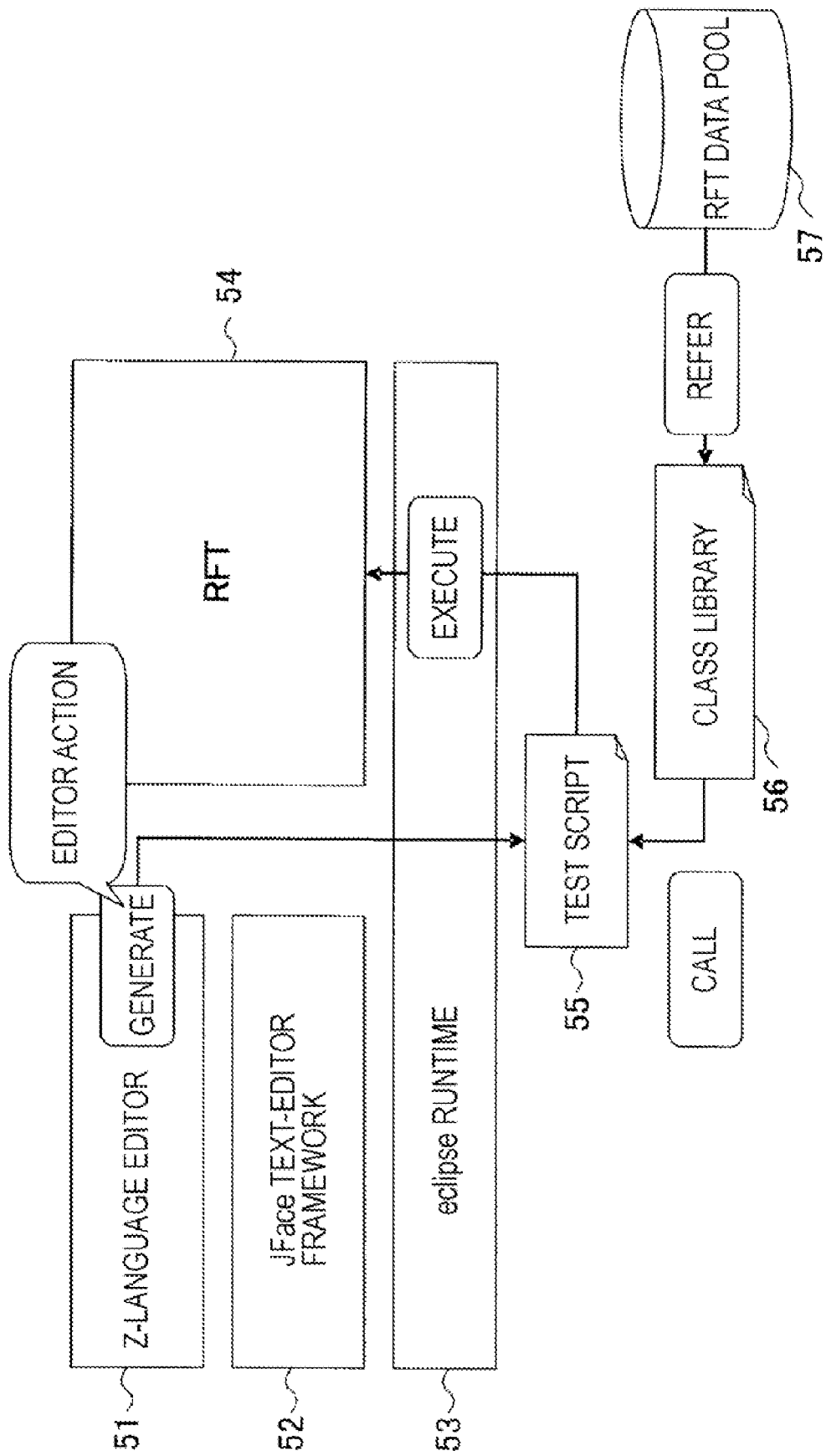
FIG. 5 is a diagram of the system configuration in which a Z language editor is installed as Eclipse plug-in, and it is associated with RFT in the first embodiment of the invention.

(6) Verification of Effectiveness: To verify the effectiveness of the embodiment of the invention, a Z language editor was installed as Eclipse plug-in and was associated with RFT. FIG. 5 shows the system configuration. A class library 56 corresponds to the runtime library 11 in FIG. 1, which is the wrapper class described in (3) and (4). Executing a test script 55 described in Java™ allows automated testing of Web applications. The script is described as an action (click etc.) for DOM objects (links or buttons) on the browser. An RFT 54 can describe the script in the form of an action to an object and has an API for dynamically searching an object. For verification, the specification of a sample application was described in Z language, and a functional test script for the RFT 54 was automatically generated by an action called from an editor menu.

The first two lines of the following script correspond to the schema 23 in FIG. 2. Executing the script on the RFT allowed the behavior of the application to be reproduced, allowing automatic comparison between the text displayed on the browser and an expected value.

link. click ("book")
HtmlText. test ("abstract")
submit. click ("order")

htmlText. test ("prompt")
textInput. setText ("username", "userValue");
submit. click ("confirm");
htmlText. test("accept")

In the first embodiment, Z language is used as a formal specification language, and RFT is used as an automated testing tool. The format specification tool may not be limited to Z language but another language such as VDM may be used. Here conditions for the formal specification language are as follows:

1) Specification can be described in screens.
2) Screen transition can be described with a combination of the specifications described in screens.
3) An input variable and an output variable can be specified.
4) The type of an input variable can be found.

The automated testing tool for applying the invention is not limited to the RFT but any testing tool that meets the following conditions can be applied.

1) The script can be described in the form of an action to an object.
2) A GUI object can be found by assigning the attributes (the class, label, etc.) of the object to keys.

Although many methods for extracting programs from formal specifications have been researched, they inevitably need manual operations because of difference in abstraction between specifications and programs. The embodiment of the invention has proposed a method for automatically generating a functional test script from formal specifications by connecting the specifications with functional tests. This has become possible because the abstraction levels of specifications and functional tests are principally near each other even with the above-described gap. Such s method has not been known and can be developed variously. For example, a plurality of test scripts including normal and error systems may be generated or a script for boundary value testing may be generated using a plurality of data pool records.

A second embodiment in the case where UML is used in describing a specification will now be described.

Figure 6:
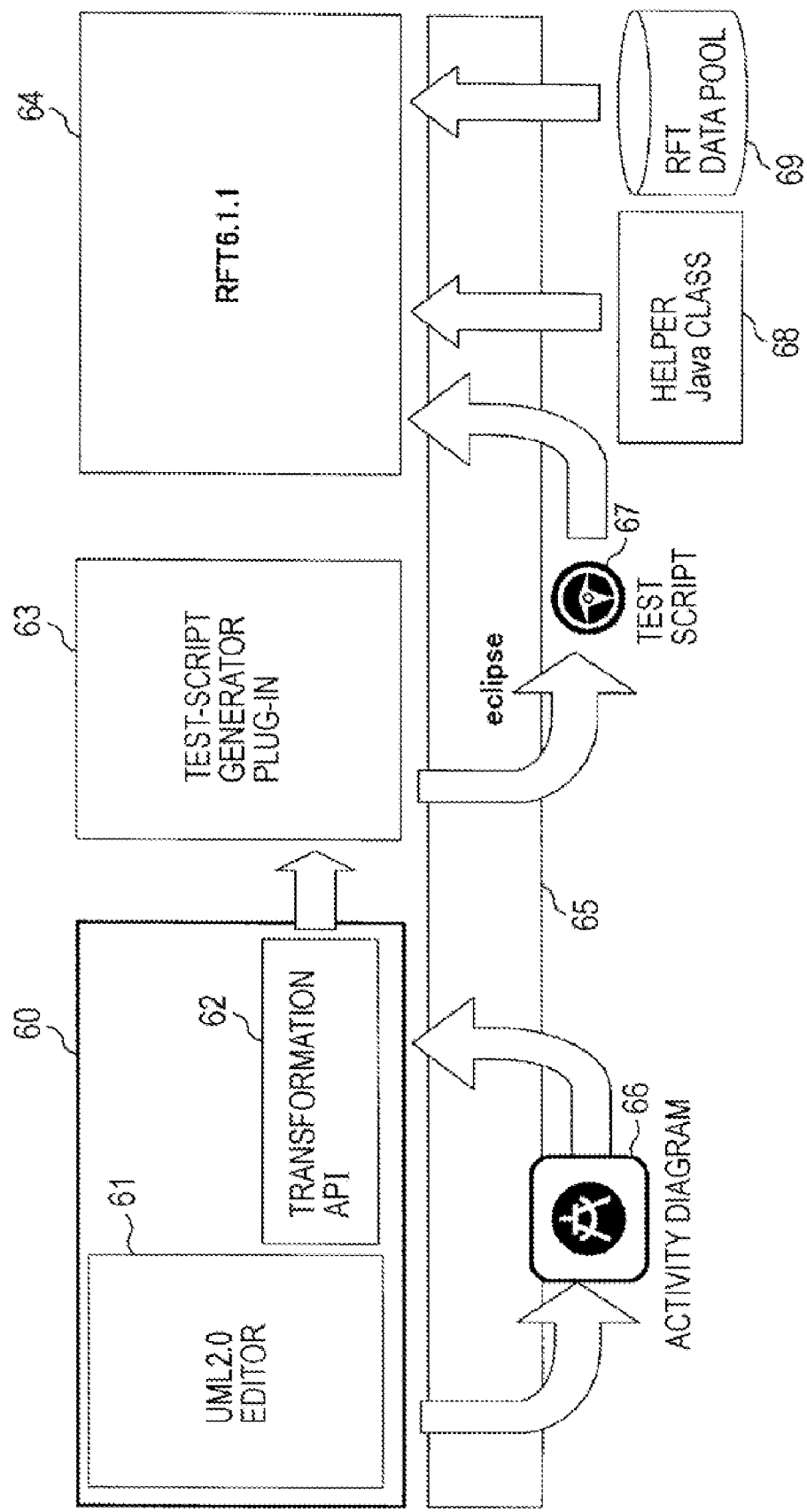
FIG. 6 is a diagram showing a system configuration in which UML is used in describing a specification according to a second embodiment of the invention.

FIG. 6 shows a system configuration in which UML is used in describing a specification. In this configuration, a UML activity diagram (indicated by numeral 66) is used to describe the specification, and RFT.6.1.1 (numeral 64) is used as an automated testing tool as in the foregoing embodiment. Here, an activity diagram generated on Ellipse (65) using a UML 2.0 editor (61) is analyzed by a test-script generator plug-in 63 via a transformation API (numeral 62) to generate a test script 67. The RFT6.1.1 (numeral 64) executes the test script 67 with reference to a helper Java class 68 (corresponding to the runtime library 11 in FIG. 1) and an RFT data pool 69 to execute testing. Hereinafter, the details will be described.

Figure 7:
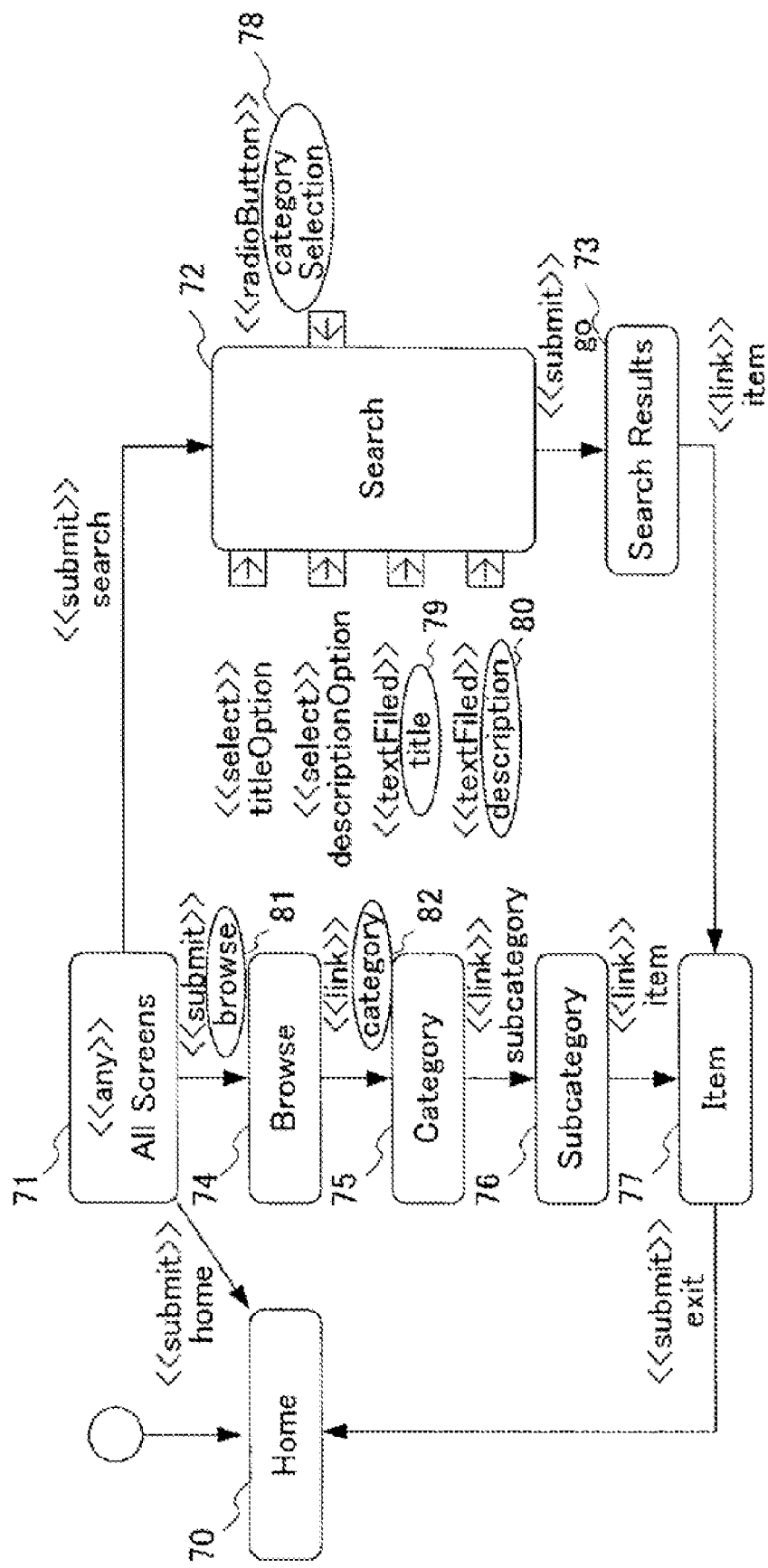
FIG. 7 is a diagram showing an example of the activity diagram of ULM in the second embodiment of the invention.

(1) Method for Describing Specification: First, the specification is described in the UML activity diagram. FIG. 7 shows an example of the activity diagram, in which the actions of the ULM elements in the activity diagram are as follows:

CallBehaviorAction

Individual screens: Home 70, Browse 74, etc. in FIG. 7
 InputPin
  Form elements such as a text field: title 79, description 80, etc. in FIG. 7
 ControlFlow Screen transition: browse 81, category 82, etc. in FIG. 7

A UML profile is defined and UML elements are extended according to the following stereo types.

A Stereotype for CallBehaviorAction:
  any (any screen), noTest (indicating that the comparison between the text information of the screen and an expected value is not made, that is, it is not to be tested)

Stereotype for InputPin:
  textField (indicating a text field), select (indicating a list box), radioBntton (indicating a radio button), etc.

Stereotype for ControlFlow:
  link (Indicating an anchor tag), submit (indicating a submit button)

FIG. 8 shows the UML stereotypes and descriptions thereof.

(2) Dynamic Search for Object and Drive of Action: To describe a generated script in a simple form, wrapper class is generated using RFT API to each GUI object. For example, when submit button, go, is clicked, the description is as follows:

```
//initialization
Submit submit = new Submit (this);
// body
    :
    :
submit, click ("go");
```

First, an object corresponding to "go" is dynamically searched for in the browser in Submit class. The key for search includes an object type and a button name. Here although "go" is a submit button name appearing in the specification, it is conceivable that the button name for implementation is generally different. Accordingly, the data pool of RFT in Submit class is accessed to obtain implementation name. However, since it is complicated to register implementation names to all the specification names in the data pool, we has devised so that the specification name is used as it is when it is not registered in the data pool. Then, click method is called for the found object.

(3) Comparison between Expected Value Displayed on Screen and Text Displayed on Browser: An expected value displayed on the screen and the text displayed on the browser are compared. For example, referring to FIG. 7, an expected value for the Browser screen is described in the data pool of RFT to achieve the separation of the script from the data. To obtain the text displayed on the browser, a wrapper class called HtmlText is generated, in which an object of a class "Html. HtmlDocument" is dynamically searched for. Its text attribute is a text displayed on the browser. Comparing the expected value and the measured value using the Verification-Point class of RFT allows test results to be automatically obtained at the end of testing. Since it is complicated to input all the characters displayed on the browser as an expected value, the expected value can also be input by normal expression.

(4) Algorithm for Generating Test Script in which All ControlFlow is Passed: The following algorithms (4-1) and (4-2) are executed continuously to generate a test script in which all ControlFlow on the activity diagram is passed at least one time.

(4-1) Generating Plural Test Script by Breadth-First Search:

1) Obtain an initial test script <Home> by starting from the screen (in the case of FIG. 7, Home) directly after the starting end of the activity diagram.

2) The following operation is executed by the number (referred to as size) of Control-Flow that are not passed among the ControlFlow starting from the end of the test script. Here take it into account that the screen having a stereotype <<any>> 71 indicates any screen. Therefore, ControlFlow starting from Home includes home, browse, and search.

3) The test script is copied as many as the number of size, to each of which the screen at the end of ControlFlow is added. These ControlFlow are marked as being passed, and the process returns to 2).

4) Process for all the test scripts is finished when there is no unpassed ControlFlow starting from the end screen.

As a result, the following three test scripts are generated in the case of FIG. 7.

-<Home>-<Home>
-<Home>-<Browse>-<Category>-<Subcategory>-<Item>-<Home>
-<Home>-<Search>-<SearchResults>-<Item>-<Home>

(4-2) Merging of Test Scripts Obtained in (4-1): The test scripts obtained in (4-1) are merged together in sequence. When the last screen of the $i^{th}$ test script and the first screen of the $i+1^{th}$ test script are the same, the latter is omitted. When they are different, transition is made in which the URL of the top screen (in this case, Home) of the application is designated so as to shift to the first screen of the $i+1^{th}$ test script. As a result, the test scripts are merged into the following one test script:

<Home>-<Home>-<Browse>-<Category>-<Subcategory>-<Item>—(URL transition)—<Home>-<Search>-<SearchResults>-<Item>-<Home>

A more detailed algorithm of the path for screen transition will be described in a third embodiment, to be described later.

(5) Algorithm for Generating Test Script for Comprehensive Execution of Combinations of Form Elements: Of Form elements of HTML, for such elements that a limited number of items are selected from multiple items, their combinations are comprehensively tested.

For the application of FIG. 7, there are two kinds of titleOption, two kinds of descriptionOption, and seven kinds of category Selection, Therefore, it is necessary to execute the screen (Search screen) containing Form elements repeatedly for a total sum of 2×2×7=28 times. To execute the repetition with the shortest path, the following algorithm is used:

1) Find the smallest of the paths starting from Form screen and returning to Form screen. In the case of FIG. 7, <Search>-<SearchResults>-<Search> is found. However, the path is not always present generally.

2) Find the smallest of the paths that starts from the screen next to Form screen and shifts to the top screen of the application by URL transition into Form screen. Such a path is always present.

3) Compare the lengths of the paths of 1) and 2), and repeat execution with a shorter path.

The optimum method for comprehensively testing the combinations of Form elements will be further described in a fourth embodiment.

FIG. 9 shows an example of the generated test script. The part denoted by numeral 91 indicates a part obtained by instancing the helper class. In the screen operation by the user, the part indicated by numeral 92 is for selecting a list box; the part indicated by numeral 93 is for setting a text field; the part indicated by numeral 94 is for selecting a radio button; the part indicated by numeral 95 is for clicking a submit button; and the part indicated by numeral 96 is used for comparing the texts.

FIG. 10 shows the case of searching for "Radio Button" as an example of dynamic search for a GUI object. Search keys are Class, Name, and Value. The Class key is determined as Html.INPUT.radio because this is an instance of Radio Button helper class. The data pool 97 is searched with the first argument of a select method, "categorySelection" as a key to find an implementation name "detailedSearchForm:radio1". This serves as Name key. The data pool 97 is searched also with the second argument "All" of the select method. However, there is no corresponding entry. Therefore, the specification name, All, is used as Value key. A GUI object is automatically searched for with the three keys, so that "All Categories" button is found from a radio button group 99.

Third Embodiment: An algorithm for generating a less redundant test script will be described for the above-described test script.

Figure 11:
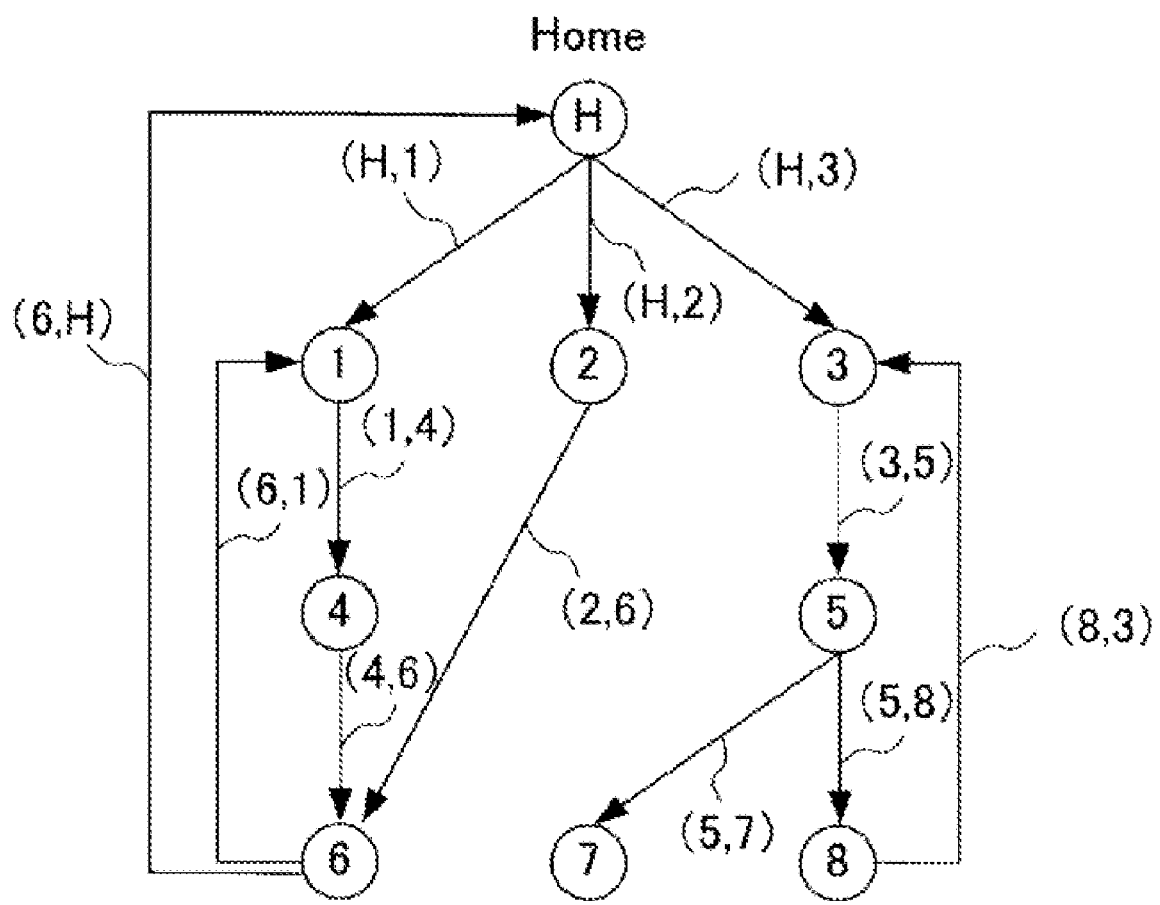
FIG. 11 is a directed graph of screen navigation according to a third embodiment of the invention.

The navigation on the screens of a computer application can be expressed as a directed graph starting at one Home node. FIG. 11 schematically shows the directed graph. The screens are expressed as 1, 2 and so on in correspondence with the nodes, while screen transition is described as (1, 4) or the like in correspondence with the edges. The continuous screen transition starting at Home is called a path, which is expressed as (H, 1, 4) or the like. The continuous screen transition without starting at Home is called a sub path, which includes (1, 4, 6).

From the viewpoint of path coverage in functional testing, (a) it is necessary to find a set of paths that pass all the edges at least one time. In the case of FIG. 11, the following set A meets the condition.

Set A={(H, 1, 4, 6), (H, 2, 6, H), (H, 2, 6, 1), (H, 3, 5, 7), (H, 3, 5, 8, 3)}

However, this set is redundant because edges H→2, 2→6, H→3, 3→5 are passed two times. The number of passages is defined for each edge to show the redundancy. The number of passages indicates how many times each edge is passed by a set of paths. For set A, the number of passages of the four edges is two, while the number of passages of the other edges is 1. Thus, it is desirable to meet the condition (a) and also (b) find a set of paths whose sum total of passages is as small as possible.

(1) A simple algorithm that meets the condition (a) includes a breadth-first method. This is a method of starting from Home and copying the path every time the edge branches.

```
<Algorithm 1>
Paths = {(H)};
Output = { };
while (Paths are not empty) {
    NextPaths = { };
    for (all paths in Paths) {
        CopyNum = (the number of unpassed edges of edges starting from the node at the end of Path);
        if (CopyNum! = 0) {
            copy Path by CopyNum;
            add the respective edges to the front ends of the copied paths;
            add the paths to NextPaths;
        }
        else {
            add Path to Output
        }
    }
    Paths = NextPaths;
}
Result = Output;
```

FIG. 12 shows how Paths and Outputs change at the determination of the conditions of sentence while in the case where this method is applied to FIG. 11.

(2) Depth-first Method: The breadth-first method has the disadvantages that the set of paths generated by the method has high redundancy and a large volume of memory is used at a time for generation. A method for reducing them includes a depth-first method in which the edges are passed from Home as much as possible. However, a simple depth-first method causes unpassed edges, thus needing some device. Thus, the following definitions are first made.

The distance from home node to a node is the number of shortest steps from home node to the node. For example, in FIG. 11, the distance from Home node to node 4 is 2. The distance from home node to edge is the distance from Home node to the first node of an edge. For example, in FIG. 11, the distance from Home node to edge (4, 6) is 2.

```
<Algorithm 2>
Edges = {Set of all edges};
Output = { };
while (Edges are not empty) {
    Select any Edge A that is nearest to Home from Edges;
    Connects another Edge B in Edges to Edge A. Here (the terminal
node of Edge A) = (the first node of Edge B). When a plurality of Edges
B is present, select any one of them. Similarly, continue to connect Edge
C, Edge D, and so on as long as they are present. However, on arrival at
Home, finish the connection. Set the obtained subpath as Subpath;
    Eliminate the edges in Subpath from Edges;
    Connect the shortest path (any path when a plurality of paths is
present) connecting Home and the first node of Subpath. Set the
obtained path as Path;
}
    Add Path to Output
Result = Output;
```

FIG. 13 shows how Edges and Output change at the determination of the conditions of the sentence while in the case where this method is applied to FIG. 11. Since the algorithm has three options, other results may be given.

(3) Depth-First Connection Method: Although the method of (2) has lower redundancy than that of (1), the results of application to the directed graph in FIG. 11 shows that the part (H, 3, 5) of the paths (H, 3, 5, 7) and (H, 3, 5, 8, 3) is passed two times.

Figure 14:
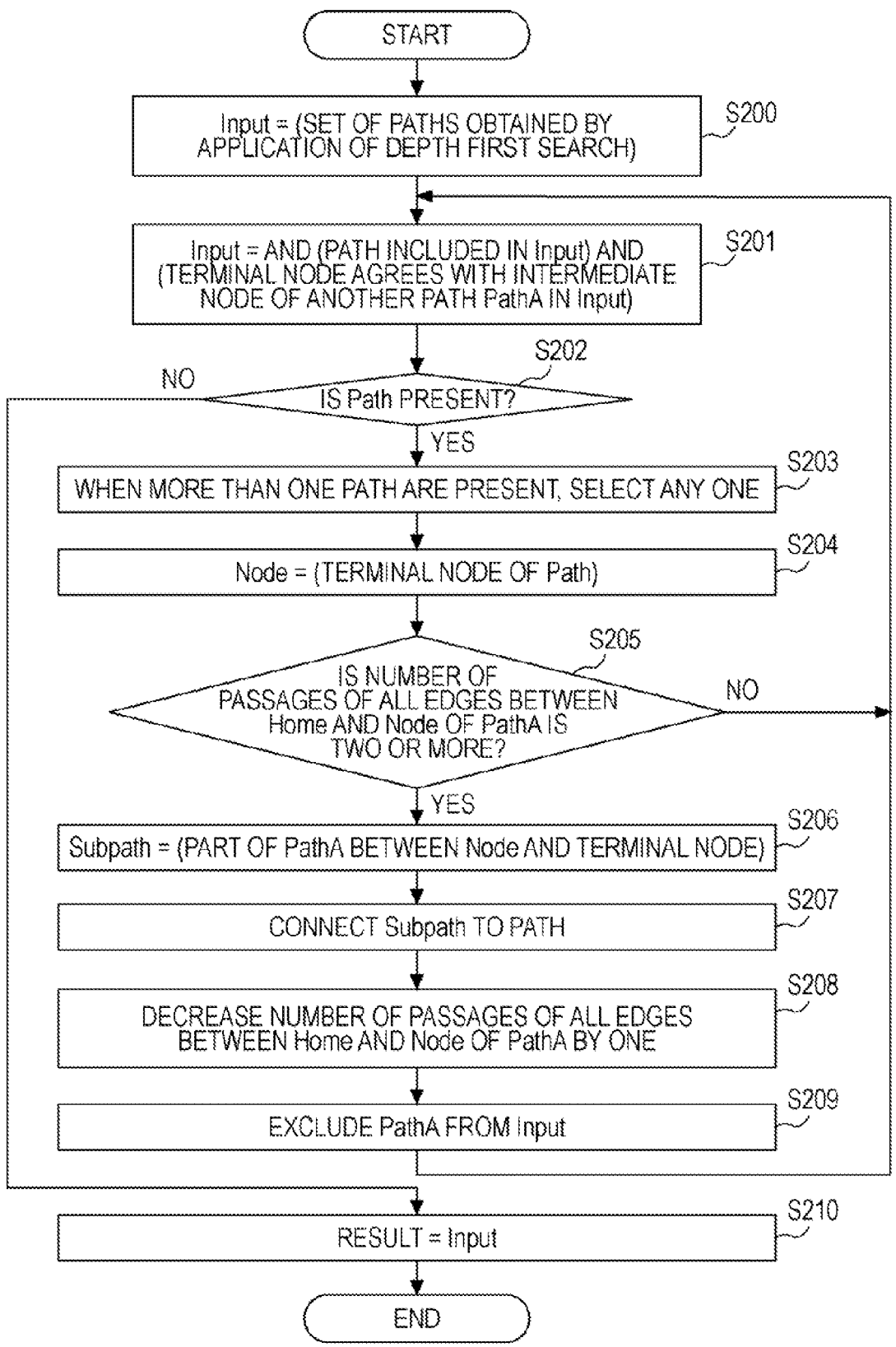
FIG. 14 is a flowchart for algorithm 3 in the third embodiment of the invention.

An algorithm 3 improved in this point is shown in the flowchart of FIG. 14. Here, "intermediate node" is defined as a node, of the nodes in the path, which is different from Home node and the terminal node.

```
<Algorithm 3>
Input = {Set of paths obtained after application of the depth-first method};
do {
    Path = (contained in Input) AND (the terminal node agrees with the
intermediate node on another path PathA contained in Input);
    if (Path is present) {
    When one or more Paths are present, select any one of them;
    Node = (the terminal node of Path);
    if (the number of passages of all the edges between Home and Node
of PathA is two or more)
{
    Subpath = (part between Node and the terminal node of PathA);
    Connect Subpath to Path;
    Decrease the number of all the edges between Home and Node of
Path A by one;
    Eliminate PathA from Input;
    }
}
else {
        break;
} while (true)
Result = Input;
```

When this method is applied to FIG. 11, the results {(H, 1, 4, 6, H), (H, 2, 6, 1), (H, 3, 5, 8, 3, 5, 7)} are obtained.

In summary, the redundancy is defined in a set of paths as the difference the sum total of passages minus the number of edges in a set of paths. FIG. 15 shows the difference in redundancy when the methods are applied to the directed graph of FIG. 11. For FIG. 11, the redundancies cannot be improved more.

Figure 16:
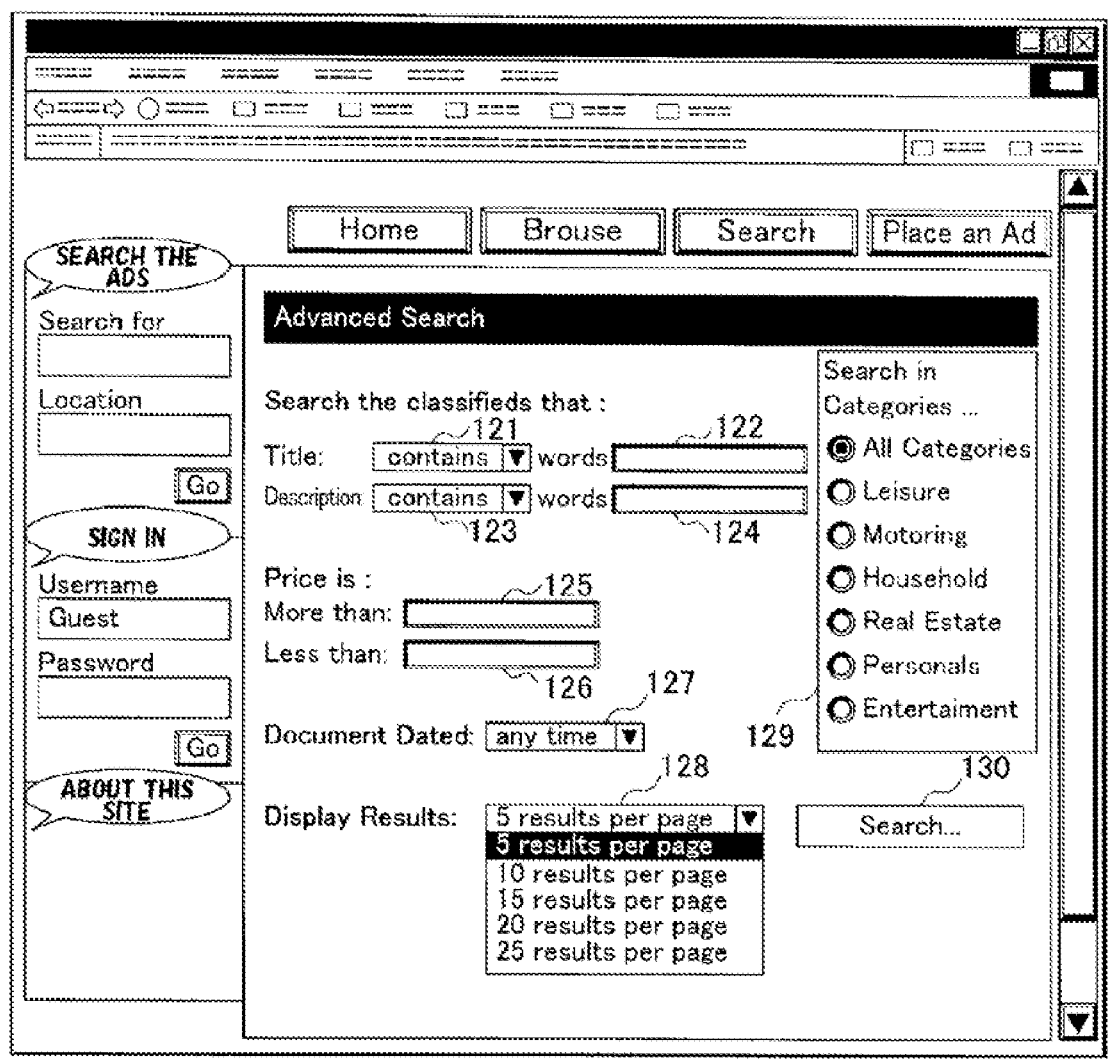
FIG. 16 is a diagram showing an example of an application screen having Form elements according to a fourth embodiment of the invention.

As a fourth embodiment, a method for finding a set of paths for executing the shortest screen transition in testing any combination of Form elements will be described. The screens of applications generally have Form elements as shown in FIG. 16. The screen in FIG. 16 has Form elements as shown in FIG. 17. Form elements on the screen of FIG. 16 include the list box of Title 121 (two options), the list box of Description 123 (two options), the list box of Document Dated 127 (three options), the list box of Display Results 128 (five options), and the radio buttons of Search in Categories (seven options). Here TextField 122, 124, 125, and 126 are omitted.

It is preferable that any combination can be tested in view of testing without leakage of Form elements. For this purpose, the screen needs to be repeatedly executed by 420 times=2× 2×3×5×7.

Suppose that the screen is node 5 of FIG. 11, and shifts to node 8 by pushing of Search . . . button 130. If is necessary to execute the edge (5, 8) 420 times so as to test all the combinations of Form elements. Although it is the shortest path that returns to node 5 directly after transition to node 8, it is generally impossible. For example, for Web applications, the URL of node 5 can be assigned to the location field of the browser. However, since the applications have a state therein, an error often occurs. Such forced transition can generally be made only for Home node.

Accordingly, a reliable method is to shift directly to Home node after transition to node 8, then passing the path (H, 3, 5). This is called Home transition method. This method does not always provide the shortest path. An algorithm improved in this point (Form-screen transition method) will be described hereinbelow.

First, the following definitions are made. The form node is a node having Form element, for example, which corresponds to node 5 of FIG. 11. The form-execution result node is a node to be shifted after execution of Form node, for example, which corresponds to node 8 of FIG. 11. Symbol "+=" indicates that the path on the right side is connected to the tail end of the path on the left side <Algorithm 4>:

Suppose that Form node is NodeA and Form execution result node is NodeB. Suppose that the path to NodeA is Path A. Let x be the distance between Home node and NodeA, and N be the repeat count of Form node; the shortest distance y from NodeB to NodeA is found by Dijkstra method, and its subpath is called Subpath. When it is impossible to reach NodeA, y is +infinity;

```
if (x+1 > y) {
    Path = Path A;
    Path += (NodeA, NodeB);
    For (int i = 0; i < N-1; i++) {
        Path += Subpath;
        Path += (NodeA, NodeB);
    }
}
else {
    Path = null;
    for (int i = 0; i < N-1; i++) {
        Path += PathA;
        Path += (NodeA, NodeB);
        Path += (NodeB, Home);
    }
    Path += PathA;
    Path += (NodeA, NodeB);
}
Result = Path;
```

Figure 18:
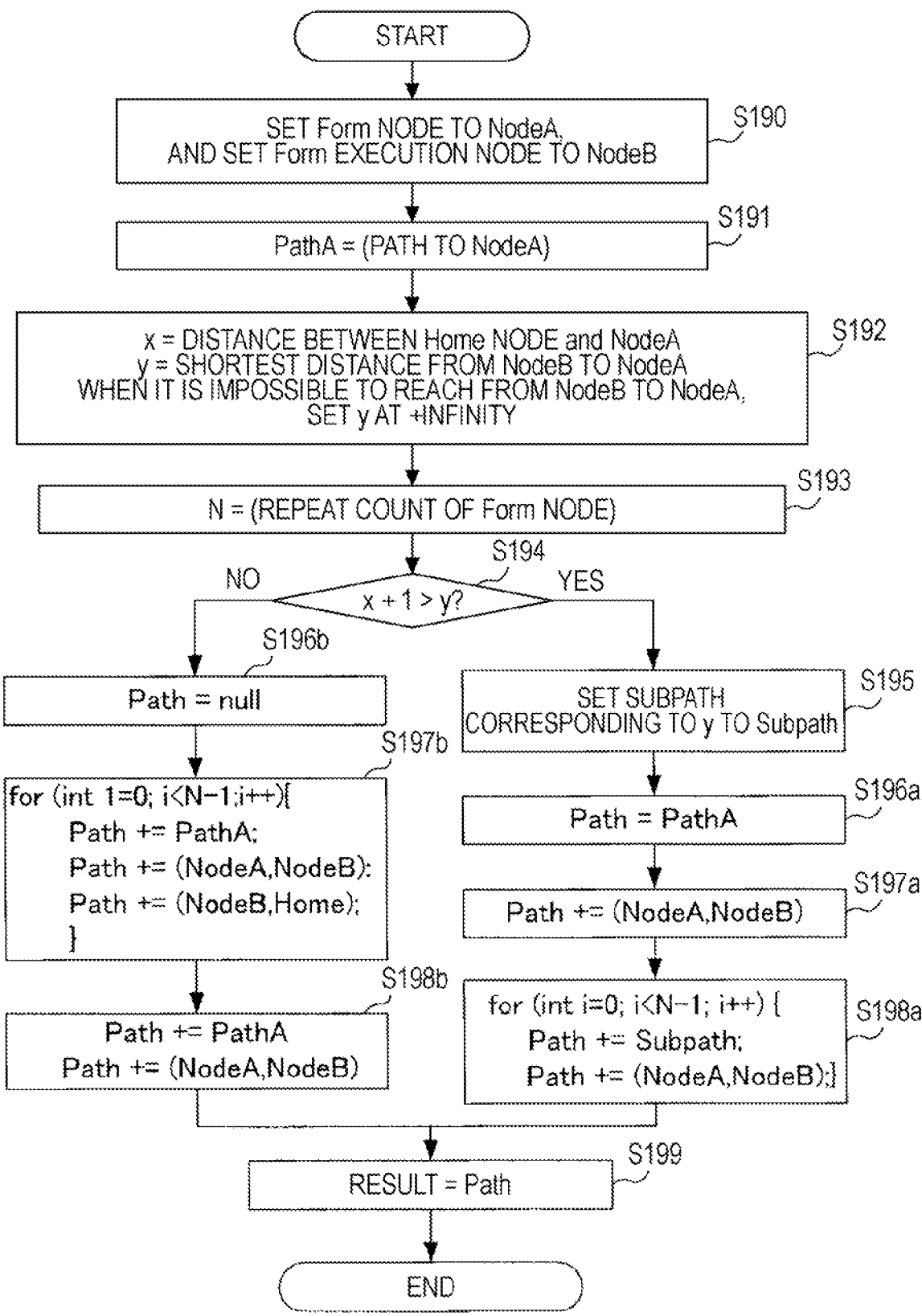
FIG. 18 is a flowchart for algorithm 4 in the fourth embodiment of the invention.

FIG. 18 is a flowchart for algorithm 4.

FIG. 19 shows the execution count of screen transition when Home transition method and Form-screen transition method are applied to the directed graph of FIG. 11. This shows that Form screen transition method can save the execution count.

In a fifth embodiment, assume a structure in which a data pool and the entries therein are not present.

The name of Form element for use in designing and that for implementation are generally different. For example, at designing, a radio button may be named categorySelection, while, at implementation (for the purpose of standardization or the like), it may be named detailedSearchForm:radio1. To map them, the invention can use a data pool. Here, no data pool may be used. In this case, assume that the name used in designing is used also in implementation. The names can be coresident, in other words, one Form element can be mapped from design name to implementation name using a data pool, while another Form element may be held in design name.

FIG. 20 shows an example of implementation in which coresident configuration is allowed. Access to the data pool is given through a line indicated by numeral 180. When there is no entry using design name as key, an exception occurs, and design name is used at it is (a line indicated by numeral 181).

(1) Use of Normal Expression in Expected Value: At the execution of functional testing, the measured value on the screen and the expected value are compared. This is performed through comparison of character strings. The amount of the character string to be measured can be enormous. Accordingly, it takes much labor to input an expected value that agrees with it, with possible typing mistake. To cope with the problems, the invention has enabled to use normal expression for the expected value. For example, when normal expression ".*Search for Location.*" is assigned to a measured character string "Jan. 16, 2006, Monday, Search for Location Username Password", the test can attain success. Here ".*" is a metacharacter indicative of any character larger than or equal to zero.

Figure 21:
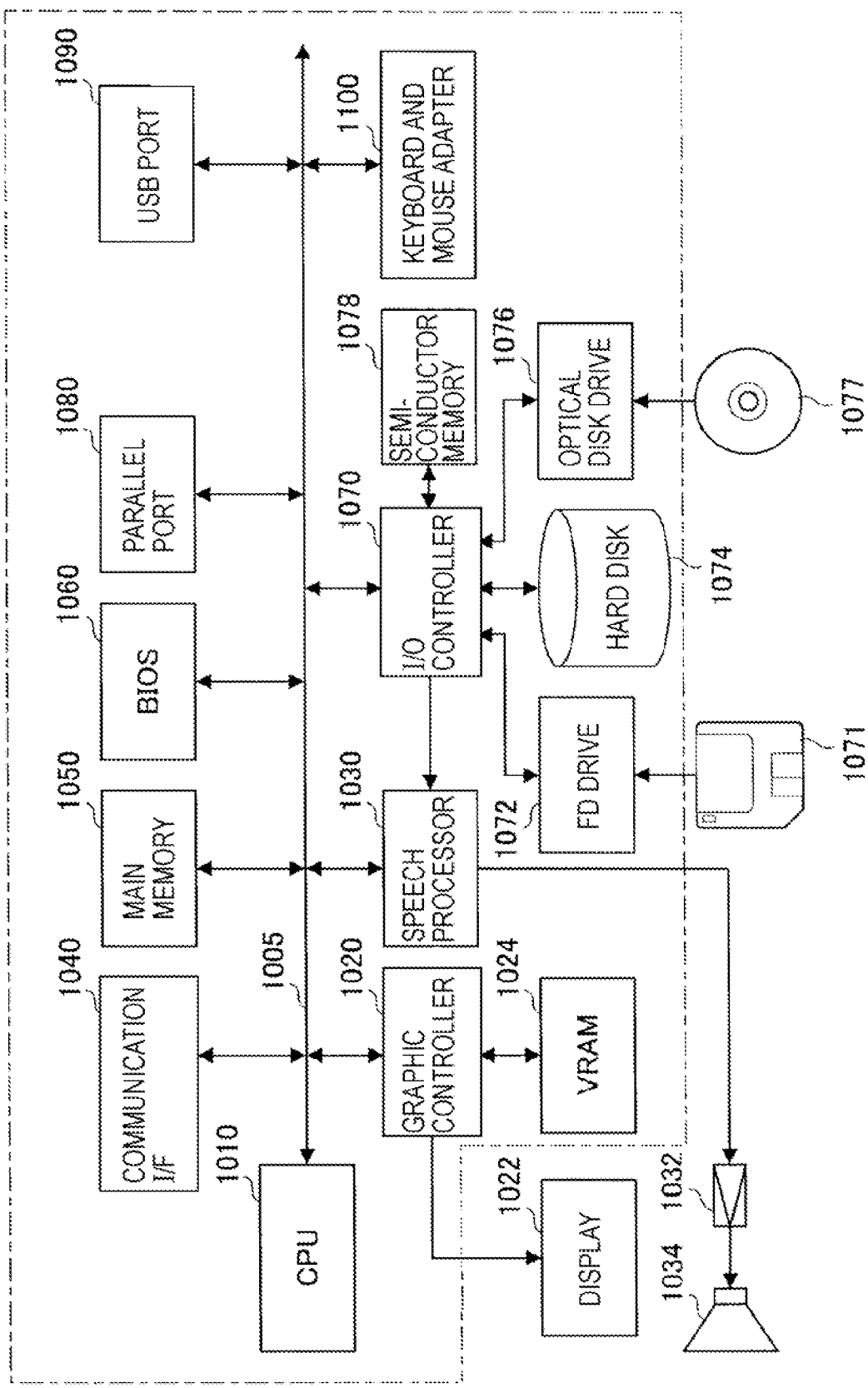
FIG. 21 is a diagram showing an information processing unit 100 as a typical example of the hardware of the test-script generating apparatus 10.

FIG. 21 shows an information processing unit 100 as a typical example of the test-script generating apparatus 10 in FIG. 1. An example of the hardware configuration of the information processing unit 100 will be described. The information processing unit 100 includes a central processing unit (CPU) 1010, a bus line 1005, a communication I/F 1040, a main memory 1050, a basic input-output system (BIOS) 1060, a parallel port 1080, a USB port 1090, a graphic controller 1020, a VRAM 1024, a speech processor 1030, an I/O controller 1070, and input means 1100 including a keyboard and a mouse adapter. The I/O controller 1070 can connect to storage means such as a flexible disk (FD) drive 1072, a hard disk 1074, an optical disk drive 1076, and a semiconductor memory 1078.

The speech processor 1030 connects to an amplifier circuit 1032 and a speaker 1034. The graphic controller 1020 connects to a display 1022.

The BIOS 1060 stores a boot program executed by the CPU 1010 at the start of the information processing unit 100 and programs depending on the hardware of the information processing unit 100. The flexible disk drive 1072 reads programs or data from a flexible disk 1071 and provides them to the main memory 1050 or the hard disk 1074 via the I/O controller 1070.

Examples of the optical disk drive 1076 include a DVD-ROM drive, a CD-ROM drive, a DVD-RAM drive, and a CD-RAM drive. In this case, an optical disk 1077 corresponding to each drive has to be used. It is also possible that programs or data are read from the optical disk 1077 with the optical disk drive 1076, and are provided to the main memory 1050 or the hard disk 1074 via the I/O controller 1070.

Computer programs are provided to the information processing unit 100 by the user through a recording medium such as the flexible disk 1071, the optical disk 1077, or a memory card. The computer programs are read from the recording medium via the I/O controller 1070, or downloaded via the communication I/F 1040 and installed in the information processing unit 100 for execution. The operation that the computer programs works on the information processing unit is omitted here because it is the same as that of the test-script generating apparatus 10 described with reference to FIGS. 1 to 20.

The computer programs may be stored in an external storage medium. Examples of the storage medium are, in addition to the flexible disk 1071, the optical disk 1077, and the memory card, magneto-optical recording media such as an MD and tape media. Furthermore, a storage unit such as a hard disk or an optical disk library in a server system connected to a dedicated communication line or the Internet can be used as a storage medium, from which computer programs may be sent to the information processing unit 100 via the communication line.

Although the invention has been described with the information processing unit 100, the same functions as those of the information processing unit can be achieved in such a manner that programs having the functions are installed in a computer, and the computer is operated as an information processing unit. Accordingly, the information processing unit described as an embodiment of the invention can also be achieved by the above-described methods and computer programs therefor.

The apparatus of the invention can be achieved by hardware, software, or a combination of hardware and software. A typical example of execution by the combination of hardware and software is by a computer system having a predetermined program. In such a case, the predetermined program makes the computer system execute the process according to the invention in such a manner that it is loaded on the computer system and executed. The program includes an instruction group that can be expressed by any language, code, or notation. Such an instruction group enables the system to execute predetermined functions directly or after one or both of (1) conversion to another language, code, or notation and (2) duplication in another medium have been made. Of course, the scope of the invention includes not only the program itself but also a program product including a medium in which the program is stored. Programs for executing the functions of the invention can be stored in any computer readable medium such as a flexible disk, an MO, a CD-ROM, a DVD, a hard disk, a ROM, an MRAM, or a RAM. The programs can be downloaded from another computer system connected via a communication line or can be copied from another medium so as to be stored in a computer readable medium. Such programs may also be compressed or divided into two or more and stored in one or more recording media.

Although the invention has been described in its preferred embodiments, the technical scope of the invention is not limited to that of the embodiments. It is to be understood by those skilled in the art that the embodiments can be variously changed and modified. Accordingly, it should also be understood from the description of the claims that various changes and modifications are included in the technical scope of the invention.

| Reference Numerals | |
|---|---|
| 1: | specification file |
| 2: | input/output variable extracting section |
| 3: | screen-transition extracting section |

-continued

Reference Numerals

| | | |
|---|---|---|
| 4: | input/output variable | |
| 5: | input/output variable type | |
| 6: | screen-transition information | |
| 7: | test-script generating section | |
| 8: | test-script file | |
| 10: | test-script generating apparatus | |
| 11: | runtime library | |
| 12: | application under test | |
| 13: | automated-testing execution tool | |
| 20: | formal specification | |
| 21: | declaring section | |
| 22: | axiom section | |
| 23: | schema | |
| 24: | schema composition | |
| 31: | input variable book | |
| 32: | output variable abstract | |
| 33: | property file | |
| 34: | functional test script | |
| 35: | data pool | |
| 51: | Z language editor | |
| 52: | JFace text editor framework | |
| 53: | Eslipse runtime | |
| 54: | RFT | |
| 55: | test script | |
| 56: | class library | |
| 57: | RFT data pool | |
| 60: | UML-specification analyzing section | |
| 61: | UML2.0 editor | |
| 62: | transformation API | |
| 63: | test-script generator plug-in | |
| 64: | RFT6.1.1 | |
| 66: | activity diagram | |
| 67: | test script | |
| 68: | helper Java class | |
| 69: | RFT data pool | |
| 70: | Home screen | |
| 71: | All Screen | |
| 72: | Search screen | |
| 73: | SearchResults | |
| 74: | Browse screen | |
| 75: | Category screen | |
| 76: | Subcategory screen | |
| 77: | Item screen | |
| 78: | CategorySelection | |
| 79: | title | |
| 80: | description | |
| 81: | browse | |
| 82: | category | |
| 91: | helper class instance | |
| 92: | list box selection | |
| 93: | text field setting | |
| 94: | radio button selection | |
| 95: | submit button click | |
| 96: | text comparison | |
| 97: | data pool | |
| 98: | table | |
| 99: | radio button group | |
| 100: | information processing unit | |

What is claimed is:

1. A processor-implemented method for generating a test script for automatic test execution tools that executes a script where actions to a GUI object for accepting an input operation are described, that searches for the GUI object at the time of execution, and that executes a software test, displayed on a display screen on a computer, comprising the steps of:

analyzing data of a specification file from a specification file storage section on a storage medium storing a specification file where functional specifications of software including the GUI object are described according to a standardized description method extracting an input variable and an output variable by the computer through the computer display screen; and generating a test script file including the test script by:

searching for a property file based upon a name of the input variable acquiring an object type name mapped by the searched input variable name and expressed using the acquired object type name and input variable name, and which includes the test script for searching the GUI object corresponding to the input variable generating the test script for a data structure without using data pools by using normal expressions with metacharacters for expected values for comparing character strings;

obtaining a path set in which a redundancy value smaller than a predetermined value is obtained by subtracting a number of the edges from a total sum of the number of times that all edges have been passed;

reducing redundancy by first utilizing a depth-first path such that a terminal node is in agreement with an intermediate node on another path;

comparing a value corresponding to the output variable which is displayed on the computer display screen at the time of a test execution, with an expected value corresponding to the output variable by automatic test execution tools on the computer;

bringing a schema for the test script and a computer display screen into one-to-one correspondence while utilizing a plurality of test script schemas simultaneously;

merging the plurality of test script schemas in sequence;

omitting a second test script when a last screen of a first test script is the same as the first screen of a second test script while merging the plurality of test script schemas; and executing the test script on the computer and displaying the test script execution on the computer display screen.

2. The method according to claim 1, the method further including:

optimizing a testing execution count by passing all edges in a computer screen transition at least once, using a directed graph in which a computer screen is regarded as a node and the computer screen transition is regarded as an edge.

3. The method according to claim 1, the method further including:

repeatedly executing a path set for executing a screen transition with a shortest distance acquired, which is the number of steps from a first node to a second node, as a path where a form node, which is a node having a form element, is repeatedly executed;

changing to the form node after changing to a home node, which is an originating point;

testing a combination of form elements that configure a display screen described in the specification file.

4. The method according to claim 2, such that the specification file is prepared using Z language or UML.

* * * * *